United States Patent
Yoon et al.

(10) Patent No.: US 12,051,146 B2
(45) Date of Patent: Jul. 30, 2024

(54) RAY CLUSTERING LEARNING METHOD BASED ON WEAKLY-SUPERVISED LEARNING FOR DENOISING THROUGH RAY TRACING

(71) Applicant: Korea Advanced Institute of Science and Technology, Daejeon (KR)

(72) Inventors: Sung-Eui Yoon, Daejeon (KR); In Young Cho, Daejeon (KR); Yuchi Huo, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 133 days.

(21) Appl. No.: 17/848,735

(22) Filed: Jun. 24, 2022

(65) Prior Publication Data

US 2023/0037418 A1 Feb. 9, 2023

(30) Foreign Application Priority Data

Jun. 28, 2021 (KR) .......... 10-2021-0083682

(51) Int. Cl.
| | |
|---|---|
| G06F 15/00 | (2006.01) |
| G06N 3/08 | (2023.01) |
| G06T 5/70 | (2024.01) |
| G06T 15/06 | (2011.01) |

(52) U.S. Cl.
CPC .............. *G06T 15/06* (2013.01); *G06N 3/08* (2013.01); *G06T 5/70* (2024.01); *G06T 2207/20081* (2013.01); *G06T 2207/20084* (2013.01)

(58) Field of Classification Search
CPC ........ G06N 3/08; G06N 3/047; G06N 3/0464; G06N 3/044; G06N 3/045; G06N 3/0895; G06T 5/002; G06T 15/06; G06T 2207/20084; G06T 2207/20081
USPC ......................................................... 345/418
See application file for complete search history.

(56) References Cited

U.S. PATENT DOCUMENTS

| | | | | |
|---|---|---|---|---|
| 11,704,865 | B2* | 7/2023 | Villegas | G06N 3/045 |
| | | | | 345/426 |
| 11,823,478 | B2* | 11/2023 | Agarwal | G06V 30/19173 |
| 2022/0108426 | A1* | 4/2022 | Xie | G06N 3/045 |
| 2022/0129705 | A1* | 4/2022 | Kim | G06V 10/454 |
| 2023/0418868 | A1* | 12/2023 | Seonwoo | G06F 16/93 |

OTHER PUBLICATIONS

Song Y, Chen C, Hu X, Yu H, Qu F. Denoising in Monte Carlo rendering based on Clustered-Residual block network. In2020 International Conference on Virtual Reality and Visualization (ICVRV) Nov. 13, 2020 (pp. 10-14). IEEE.*

(Continued)

*Primary Examiner* — Phu K Nguyen
(74) *Attorney, Agent, or Firm* — BKRIP LLC (57) ABSTRACT

Disclosed is a ray clustering learning method based on weakly-supervised learning for denoising using ray tracing. The ray clustering learning method is for learning a denoising model for removing noise from a rendered image through ray tracing, and includes extracting a feature of a simulated ray through the ray tracing and clustering the ray through contrastive learning for the feature.

13 Claims, 6 Drawing Sheets

(56) References Cited

OTHER PUBLICATIONS

Yang, X., Wang, D., Hu, W., Zhao, L., Piao, X., Zhou, D., Zhang, Q., Yin, B., Cai, Q. and Wei, X., 2018. Fast reconstruction for Monte Carlo rendering using deep convolutional networks. IEEE Access, 7, pp. 21177-21187.*
Xu B, Zhang J, Wang R, Xu K, Yang YL, Li C, Tang R. Adversarial Monte Carlo denoising with conditioned auxiliary feature modulation. ACM Trans. Graph.. Nov. 1, 2019;38(6):224-1.*
Vicini D, Adler D, Novák J, Rousselle F, Burley B. Denoising deep monte carlo renderings. InComputer Graphics Forum Feb. 2019 (vol. 38, No. 1, pp. 316-327).*
Cho IY, Huo Y, Yoon SE. Weakly-supervised contrastive learning in path manifold for Monte Carlo image reconstruction. ACM Trans. Graph.. Jul. 19, 2021;40(4):38-1.*
Prannay Khosla, Piotr Teterwak, ChenWang, Aaron Sarna, Yonglong Tian, Phillip Isola, Aaron Maschinot, Ce Liu, and Dilip Krishnan. 2020. Supervised contrastive learning. arXiv preprint arXiv:2004.11362 (2020).*
Tschannen M, Djolonga J, Ritter M, Mahendran A, Houlsby N, Gelly S, Lucic M. Self-Supervised Learning of Video-Induced Visual Invariances. In2020 IEEE/CVF Conference on Computer Vision and Pattern Recognition (CVPR) Jun. 1, 2020 (pp. 13803-13812). IEEE Computer Society.*
Gharbi M, Li TM, Aittala M, Lehtinen J, Durand F. Sample-based Monte Carlo denoising using a kernel-splatting network. ACM Transactions on Graphics (TOG). Jul. 12, 2019;38(4):1-2.*
Chen T, Kornblith S, Norouzi M, Hinton G. A simple framework for contrastive learning of visual representations. InInternational conference on machine learning Nov. 21, 2020 (pp. 1597-1607). PMLR.*
Weiheng Lin et al., "Path-based Monte Carlo Denoising Using a Three-Scale Neural Network," omputer Graphics Forum (Dec. 30, 2020).
Ting Chen et al., "A Simple Framework for Contrastive Learning of Visual Representations," arXiv:2002.05709v3 [cs.LG] Jul. 1, 2020 (Jul. 1, 2020).

* cited by examiner

| Algorithm 1 Joint Manifold-Regression Training algorithm |
|---| notations
    $\tilde{I}$ and $I$ noisy input and reference image
    $g$        auxiliary features
    $p$ and $q$ path descriptors and sampling densities
    $\Theta_F$    weights of the path embedding network
    $\Theta_R$    weights of the given reconstruction network
    $\lambda$     manifold-regression balancing parameter
procedure MANIFOLD-REGRESSION($\tilde{I}, g, p, \Theta_F, \Theta_R$)
    while not converge do
        $f = F(p|\Theta_F)$                       ▷ path embeddiing
        $f' = \text{SHUFFLE\_WITHIN\_BATCH}(f)$     ▷ non-local pairs
        $f'' = \text{SHUFFLE\_WITHIN\_PATCH}(f)$       ▷ local pairs
        $\hat{I} = R(\tilde{I}, g, f, q | \Theta_R)$            ▷ image reconstruction
        $L_{total} = \lambda(L_m(f,f',I) + L_m(f,f'',I)) + L_r(\hat{I}, I)$
        $\Theta_F, \Theta_R \leftarrow \text{ADAM}(L_{total})$
    end while
    return $\Theta_F, \Theta_R$
end procedure

FIG. 6

RAY CLUSTERING LEARNING METHOD BASED ON WEAKLY-SUPERVISED LEARNING FOR DENOISING THROUGH RAY TRACING

CROSS-REFERENCES TO RELATED APPLICATIONS

This application is based on and claims priority under 35 U.S.C. 119 to Korean Patent Application No. 10-2021-0083682, filed Jun. 28, 2021, in the Korean intellectual property office, the disclosure of which is herein incorporated by reference in its entirety.

TECHNICAL FIELD

The following description relates to a technology for removing noise from a rendered image and reconstructing the rendered image as a clean image through a ray tracing algorithm by using a clustering scheme based on weakly-supervised learning.

BACKGROUND OF THE DISCLOSURE

A predefined 3D scene is a strong constraint for inferring a reference image in Monte Carlo (hereinafter referred to as "MC") rendering. Although MC rendering suffers from severe noise at low sample counts due to its stochastic nature, reconstruction models often yield visually impressive results thanks to strong constraints, such as normal, a depth, and texture.

A geometry buffer (G-buffer) shows a high correlation with a reference image, especially where diffuse reflections are dominant. As a result, regression-based reconstruction can effectively reduce random noise from MC integration. Furthermore, recently, image-space auxiliary features have greatly improved performance of a deep learning-based noise decrease model.

Most prior methods exploit the first bounce features from high-dimensional paths. These features do not provide a sufficient representation of various light phenomena for reconstruction networks. Since path tracing involves a sequence of scattering, and thus a representation of light propagation is inherently high-dimensional. However, learning between a high-dimensional path and an optimal filtering kernel is a challenging and difficult problem due to a low correlation between paths and high sparsity of path samples.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Various embodiments propose a manifold learning framework including not only first bounce features, but also multi-bounce features which may be used in a path space, as a framework that allows MC reconstruction models to use sufficient information on path tracing.

Various embodiments propose a framework, which applies deep contrastive learning in addition to a CNN-based reconstruction model in order to learn a path-space manifold and is aimed at extracting small-sized path embedding that enables a high-dimensional path space to be easily manipulated through the learning of affinity between path samples.

Various embodiments propose a manifold learning framework capable of training a reconstruction model which identifies a path cluster and determines local filtering weights based on information.

In a ray clustering learning method performed in a computer system, the ray clustering learning method is for learning a denoising model for removing noise from a rendered image through ray tracing, and includes extracting, by at least one processor included in the computer system, a feature of a simulated ray through the ray tracing, and clustering, by the at least one processor, the ray through contrastive learning for the feature.

According to an aspect, extracting the feature may include generating a path descriptor representing radiometric properties of a light path.

According to another aspect, the path descriptor may include a channel representing a bidirectional scattering distribution function of a vertex of the light path and a channel representing a lighting condition of the light path.

According to still another aspect, clustering the ray may include mapping the feature to a low-dimensional space by using a deep neural network, and performing the contrastive learning as weakly-supervised learning by using reference pixel colors for a light path as a pseudo label, and learning the denoising model by using low-dimensional embedding of the light path trained through the contrastive learning.

According to still another aspect, performing the contrastive learning may include constructing a set of non-local pairs as a pair for the contrastive learning.

According to still another aspect, the denoising model may include a path embedding network which learns a path-space manifold and a regression-based reconstruction network which learns a correlation between pixels. Learning the denoising model may include jointly training the path embedding network and the reconstruction network with respect to a manifold loss and a regression loss.

According to still another aspect, the manifold loss may be based on a contrastive loss and may include a path disentangling loss for the learning of a path space.

According to still another aspect, training the path embedding network and the reconstruction network may include providing, as identical embedding, a manifold learning module and the reconstruction network with a probability buffer which is an output of the path embedding network.

According to still another aspect, training the path embedding network and the reconstruction network may include providing, as an input to the reconstruction network, a probability buffer which is an output of the path embedding network along with a geometry buffer.

There is provided a computer program stored in a computer-readable recording medium in order to execute a ray clustering learning method in a computer system, wherein the ray clustering learning method is for learning a denoising model for removing noise from a rendered image through ray tracing, and includes extracting a feature of a simulated ray through the ray tracing, and clustering the ray through contrastive learning for the feature.

There is provided a computer system including at least one processor configured to execute computer-readable instructions included in a memory. The at least one processor is for learning a denoising model for removing noise from a rendered image through ray tracing, and us configured to extract a feature of a simulated ray through the ray tracing and to cluster the ray through contrastive learning for the feature.

Embodiments of the present disclosure can remove noise from a rendered image and reconstruct the rendered image as a clean image through a ray tracing algorithm by using a geometry and optical weakly-supervised learning-based clustering scheme, which represents a light path by modifying the ray tracing algorithm.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, embodiments of the present disclosure are described in detail with reference to the accompanying drawings.

Embodiments of the present disclosure relate to a ray clustering learning technology based on weakly-supervised learning for denoising using ray tracing.

Ray tracing is one of rendering algorithms which are recently in the spotlight in fields, such as game, and is to simulate interactions between light and an object, such as reflection, refraction and diffusion, for a sense of reality of an image.

Such ray tracing is dependent on stochastic sampling and essentially involves the occurrence of noise, and thus image quality thereof is greatly degraded if noise is not removed.

The present disclosure relates to a technology for clustering ray clusters based on geometric and optical features in order to remove noise from an image generated through rendering. The ray tracing may be used to extract information, which is a very high dimension as an input to a network, but well contains geometric and optical features of radiances through encoding because the method is used to simulate reflection, refraction and diffusion of light, in a low-dimensional manner, and can improve denoising performance by providing such information to a denoising network as an additional input.

In the present disclosure, a contrastive manifold learning framework is introduced in order to effectively use path-space features. A framework according to the present disclosure adopts weakly-supervised learning using a reference pixel color as a dense pseudo label for a light path. Thereafter, a convolution path embedding network induces a low-dimensional path manifold by iteratively clustering embeddings within a class while distinguishing between embeddings between classes by using gradient descent. A framework according to the present disclosure extracts embedding that is low-dimensional and meaningful within a feature, thereby facilitating the path space search of a reconstruction network. In the present disclosure, visual and numerical improvements can be guaranteed in an advanced reconstruction model, in particular, a sample space reconstruction model by applying the framework to image and sample space reconstruction.

The present disclosure proposes weakly-supervised contrastive learning in a path manifold, that is, an independent design for a common regression model, in order to use path-space features in order to improve MC reconstruction.

In particular, the present disclosure presents a path disentangling loss, that is, an optimization target between samples in order to directly learn affinity between light paths and reduce the sparsity of a path space, and designs reference radiance pseudo labeling and non-local pair selection in order to avoid expensive labeling for path features.

The present disclosure may generate numerically and visually improved reconstruction results compared to the existing model when the same number of input samples is used by supplementing a common model for solving an image regression problem.

First, as related research, a deep learning-based reconstruction method for MC path tracing and a manifold learning approach in computer vision and graphic-applied fields are described.

MC Reconstruction Through Deep Learning

In MC rendering, a machine learning technique is adopted to reconstruct smooth images from noisy inputs. In one research, a recurrent convolutional neural network (RCNN), which processes MC images with extra features, are used to predict the final denoised output directly. This work produces temporally stable results in restricted lighting conditions by using temporal coherence of sequential images.

In another research, convolutional neural network (CNN) approaches to predict per-pixel filtering kernels are proposed. In some other researches, a CNN model that extends these approaches and predicts per-sample filtering kernels is described. This sample-based method shows substantial results in suppressing high-energy outliers compared to prior pixel-based methods, which only take low-order statistics (e.g., mean and variance) of radiance samples. A main drawback of the sample-based approach was a high computational cost and memory consumption, but a cost-efficient reconstruction method of distributing samples into multiple image layers is recently proposed. Furthermore, there is introduced a technology for separating auxiliary features into an image and a sample-space and predicting detailed preserved images by using separate feature extractors.

Aside from the studies exploring the network structures, a technology for guiding a reconstruction network by using a novel image gradient buffer produced by gradient domain path tracing is researched. They demonstrated that frequency information in image gradients helps the deep network to infer image smoothness at the cost of producing auxiliary inputs. Furthermore, each G-buffer channel affects their network's convergence on different extents.

Despite the large body of MC reconstruction research, most of CNN-based denoisers are trained on a single task called regression. It is difficult for the deep network to sufficiently use path features due to the complexity and sparsity of a path space. The present disclosure proposes path-space manifold learning, that is, a new target function for providing an additional guideline when a CNN-based reconstruction model is trained.

Supervised Manifold Learning

Manifold learning also known as metric learning analyzes the similarity between data to remove redundant dimensions while preserving useful information. Since manifold learning can handle high-dimensional data cost-efficiently, it has been applied to various domains, such as image recognition and image retrieval.

One of intuitive applications of manifold learning is age estimation. Intuitively, even high-dimensional face images may be mapped onto a one-dimensional number line in order of age. In one research, valuable supervision to age estimation is provided by using the ordinal relation between ages. In this case, a near-one-dimensional distribution is successfully observed in an embedded face image space.

Recently, a series of contrastive approaches have been used in the computer vision domain. These methods use contrastive losses, which learn the affinity of inputs by manipulating the distance between embedding pairs according to their label similarities. These approaches induce useful embedding spaces and provide improved results when the embeddings are used as intermediate features for their target tasks (e.g., face recognition, image classification, and shape correspondence). Furthermore, contrastive learning is useful, especially when a dataset is sparse (i.e., a limited number of data for each label).

In the present disclosure, a contrastive loss is designed in addition to a regression loss in order to remedy the sparsity of a path space and extract more expressive path embeddings for improving MC reconstruction. Since define path labels cannot be clearly defined to distinguish between intraclass pairs and inter-class pairs, path-space contrastive learning causes new challenges which are distinctive from typical image or point cloud processing. Accordingly, a weakly-supervised approach is adopted in order to lessen a strict constraint on contrastive labeling.

Manifold Techniques in Graphics

Due to the inherent complexity of the path space, the efficient handling of light paths may be a central question in MC rendering. Approaches which reduce its dimensionality by using analytic constraints of the path space or uses a path sampling method based on Fermat's principle as manifold exploration scale down the dimensionality of path integration by a specific manifold at the cost of computing the Jacobian.

Half vector space light transport (HSLT) perturbs half vectors stochastically along a sequence of path vertices. Unlike manifold exploration, HSLT performs importance sampling on those half vectors from BSDFs and geometries, facilitating path space exploration. In one research, a breakup mutation strategy is presented, which further extends HSLT to displaced geometries. In this research, specular manifold analysis is applied to complement next event estimation (NEE) combined with MC path tracing. For the manifold NEE, a method for rendering specular microgeometry and complicated surfaces induced by normal and displacement mappings is presented. Nonetheless, these techniques are not based on data-driven learning approaches.

Beside the MC rendering, various data-driven methods have been discussed thanks to recent advances in machine learning. Font synthesis is one of intuitive and valuable applications of manifold learning. In one research, the manifold of typefaces is learnt by applying a machine learning-based manifold method. In another research, the same algorithm is applied to explore a two-dimensional manifold of material appearances and to synthesize unseen materials.

In the present disclosure, a data-driven manifold technique may be used for MC reconstruction.

Hereinafter, detailed embodiments of a ray clustering learning method based on weakly-supervised learning for denoising using ray tracing are described.

The present disclosure can remove noise from a rendered image and reconstruct the rendered image as a clean image through a ray tracing algorithm using a clustering scheme based on weakly-supervised learning. The ray clustering learning method based on weakly-supervised learning according to the present disclosure includes 1) a process of extracting geometry and optical feature values that represent a light path by modifying the existing ray tracing algorithm, 2) a process of mapping an extracted feature value vector in a low-dimensional way by using a deep neural network structure in order to reduce the dimension of the extracted feature value vector, 3) a process of adjusting similar light paths so that the distance between similar light paths is reduced even in a low dimension and adjusting different light paths so that the distance between the different light paths is increased even in a low dimension by using pixel colors (RGB) of a solution image as weak labels upon low-dimensional mapping, and 4) a process of improving denoising performance by providing, as an additional input to a deep learning-based denoising model, low-dimensional embedding of a light path trained as described above.

A manifold learning framework according to the present disclosure is intended to extract small-sized path embedding which facilitates a manipulation of a high-dimensional path space by learning affinity between path samples.

Figure 1:
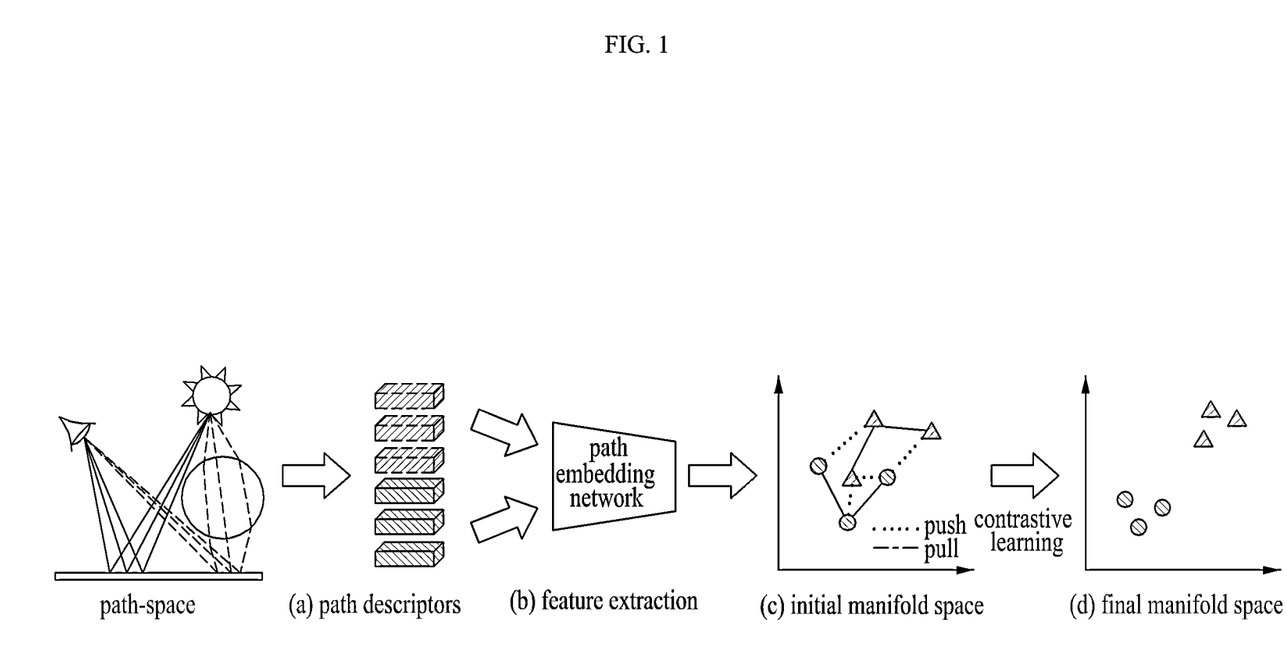
FIG. 1 illustrates an example of a weakly-supervised path spatial contrastive learning process in an embodiment of the present disclosure.

FIG. 1 illustrates an example of a weakly-supervised path spatial contrastive learning process in an embodiment of the present disclosure.

Referring to FIG. 1, a weakly-supervised path space contrastive learning method includes the following processes. (a) A path descriptor, that is, a radiance measure sequence of paths in each vertex, is extracted with respect to each path. In this case, pseudo colors emphasize the similarity between the paths. (b) A sample-based convolution network is used to convert the path descriptor into a low-dimensional space. (c) The network generates an initial manifold space that has not been structured. (d) As training is performed, a manifold learning framework improves a manifold space through optimization between samples. Two paths similar in a reference color space attract each other in a path manifold, whereas they repel each other in the opposite case. In this case, reference pixel radiance is used as a pseudo table for the path. Path space contrastive learning provides a feature which can be recognized in an MC reconstruction network and is compact by disentangling overlapped path distributions. Such embedding is inputted to a reconstruction network along with a geometry buffer, helping MC reconstruction.

Major contents of path-space manifold learning for MC reconstruction are as follows.

Path-Space Deep Neural Network (DNN)

Auxiliary features have high-quality MC reconstruction, but high-dimensional data processing techniques are inevitable in order to efficiently utilize information on light paths, that is, another important piece of MC rendering. Due to the sparsity and complexity of paths, efficient training in the path space is difficult for DNNs. One solution is to collect training samples as dense as possible. However, it often requires a large amount of data that exponentially grows with data dimensions in order to obtain stable and reliable results. Accordingly, a path space input is connected to a non-executable training time n the case of supervised learning, in particular.

Manifold Learning

Classic solutions of MC reconstruction, such as cross bilateral filtering, non-local means filtering, radiance histogram fusion, and adaptive regression, share the same philosophy, define similarity metrics of pixels and take average colors of surrounding similar pixels. As an example of the metrics, non-local means filtering uses patchwise mean luminance. Ray histogram fusion uses Chi-Square distance between two radiance histograms. When pioneering intuition is extended to a path space, it is difficult to define an affinity metric analytically due to the complexity of the path space. Accordingly, the present embodiment proposes a data-driven manifold learning method so that a reconstruction model may learn the affinity between paths and uses information in inferring its optimal parameters.

Manifold Learning Versus Regression Learning

In MC reconstruction, there is an essential difference between manifold learning and regression learning. The path-space contrastive learning aims to learn direct sample-to-sample correlation in order to discriminate overlapped path distributions as illustrated in FIG. 1. In contrast, in the image-space regression analysis, correlation between input pixels and target pixels is learnt, and a sample-space model learns correlation between input samples and target pixels. In pathological cases of overlapped samples, an image and a sample space network generate a feature map which is weak, has a lot of noise and has less information in order to distinguish between two distributions.

Joint Manifold-Regression Training

The present embodiment presents a joint manifold-regression training scheme for MC reconstruction networks.

Figure 2:
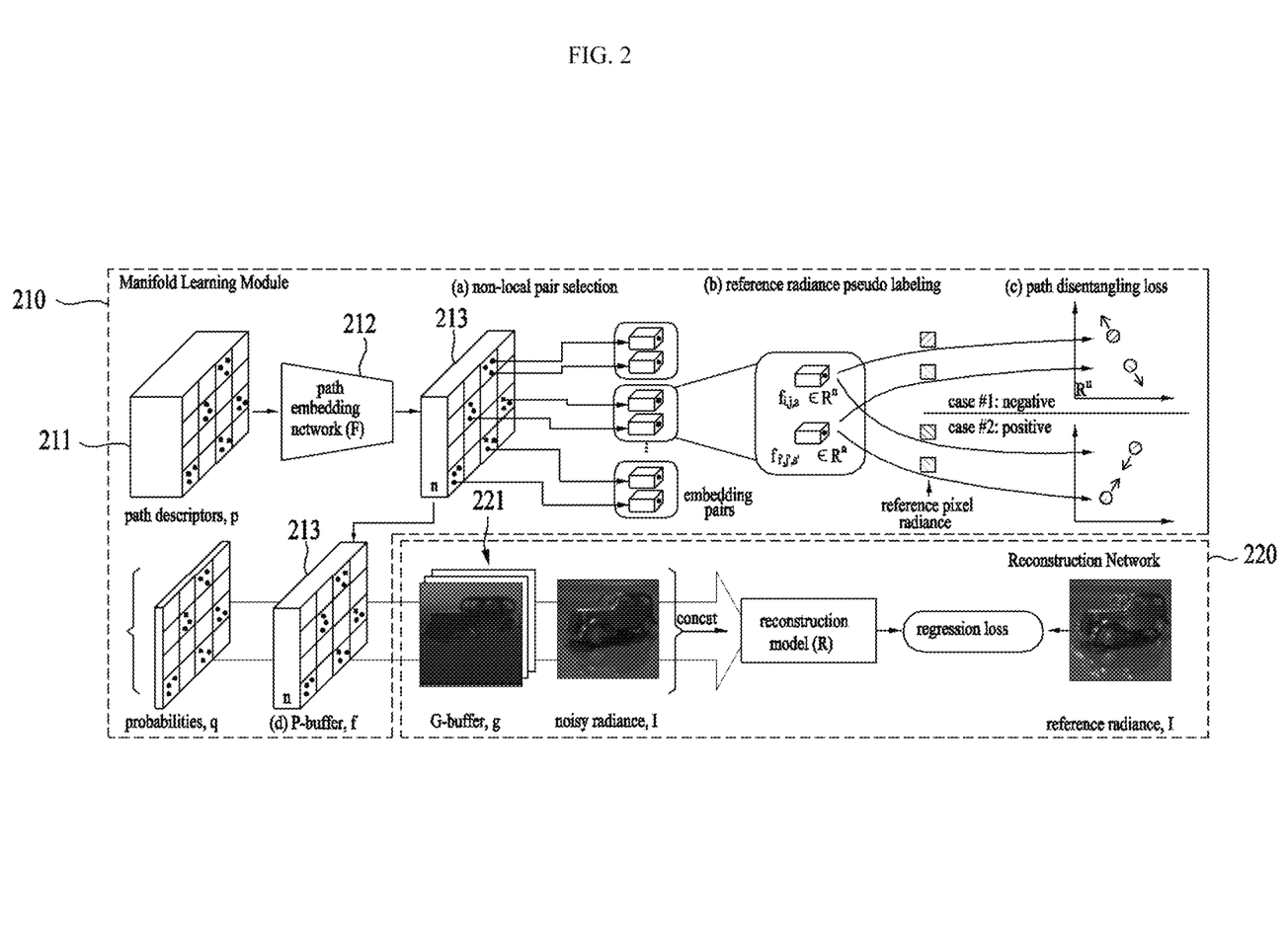
FIG. 2 illustrates an example of a manifold-regression learning framework in an embodiment of the present disclosure.

FIG. 2 illustrates an example of a manifold-regression learning framework in an embodiment of the present disclosure.

A core of an image reconstruction technique according to the present disclosure is to improve denoising performance through a deep neural network (DNN) model and a contrastive learning method. In this case, weakly-supervised learning not fully supervised learning is applied.

Referring to FIG. 2, in the present disclosure, a manifold learning module 210 is connected to a target MC reconstruction network 220. First, MC path tracing generates a high-dimensional path descriptor 211 representing radiometric properties of an individual path. Thereafter, the path descriptor 211 is supplied to a path embedding network 212 that supports a feature extractor. The feature extractor within the path embedding network 212 learns the relation between paths and a low-dimensional structure of a path space by a manifold loss and a path disentangling loss built on the top of contrastive losses. Since the contrastive loss requires labels to distinguish inter-class paths, in the present embodiment, reference pixel radiance is used as weak pseudo labels (the process (b) in FIG. 2). A low-dimensional output probability buffer (P-buffer) 213 similar to a geometry buffer (G-buffer) 221 is inputted to the reconstruction network 220 along with the geometry buffer 221. Finally, the feature extractor within the path embedding network 212 and the reconstruction network 220 are simultaneously trained on the manifold loss and an ordinary regression loss (e.g., relative L2).

Manifold learning for MC reconstruction is as follows.

The present disclosure proposes a new manifold learning framework for improving an MC reconstruction model through weakly-supervised contrastive learning. For a regression loss and a path disentangling loss, an emphasis is placed on jointly training the path embedding network 212 connected to the reconstruction network 220. The manifold learning framework according to the present disclosure may be adopted in both image- and sample space deep learning-based reconstruction modes.

A construction of the path descriptor 211 is an essential prerequisite for effective path manifold learning. A proper path descriptor 211 provides sufficient information to the manifold learning module 210 so that paths can be distinguished. Such information will help in MC reconstruction.

The following information has been known as a useful path descriptor 211.

First, as illustrated in FIG. 1, light transports on diffuse paths (solid lines) and caustic paths (dotted lines) should have vastly distinct radiance variances and intensities. Therefore, the light transports need to be separately processed throughout network layers. In fact, paths may be classified by material properties at each vertex according to the Heckbert's regular expression. Second, recent sample-based MC reconstruction methods use some of per-vertex material properties.

Features, such as a bidirectional scattering distribution function (BSDF) at each path vertex and photon energy propagated through the path, play an important role in path classification and image noise removal as well. Consequently, in the present embodiment, a path descriptor having five channels representing the BSDF of each path vertex and six channels representing each path's lighting condition is constructed. Furthermore, one channel of path sampling probability is also collected.

A radiance field at equilibrium may be defined by an integral equation called a rendering equation.

$$L_r(x,\omega_o) = \int_\Omega L(x,\omega) f_s(x,\omega_o,\omega) |\cos(\theta)| d\omega \quad \text{[Equation 1]}$$

$$L_o(x,\omega_o) = L_e(x,\omega_o) + L_r(x,\omega_o) \quad \text{[Equation 2]}$$

wherein $L_r$, $L$, $L_o$, and $L_e$ are reflected, incident, outgoing, and emitted radiances, respectively. $f_s$ is the BSDF. $\omega_o$ and $\omega$ are outgoing and incident directions at a surface point x, respectively. $\theta$ is an angle between the incident direction and a surface normal.

By using MC estimation, Equation 1 may be approximated with a sampling density $q(\omega|x, \omega_o)$ (i.e., backward path tracing) as follows.

$$\tilde{L}_r(x, \omega_o) = \frac{1}{N} \sum_{i=1}^{N} \frac{L(x, \omega_i) f_s(x, \omega_o, \omega_i) |\cos(\theta_i)|}{q(\omega_i | x, \omega_o)} \quad \text{[Equation 3]}$$

Assuming that there is a path of $\bar{x} = x^{(0)} \ldots x^{(k)}$ in which a length k from a location $x^{(0)}$ of an eye to a point of light $x^{(k)}$, $L_e(x^{(k)}, \omega_o^{(k)})$ is emitted radiance from $x^{(k)}$ to $x^{(k-1)}$, where $\omega_o^{(k)} = \omega_{x^{(k)} \to x^{(k-1)}}$.

Next, the path descriptor 211 is constructed as follows.

(1) Three channels per vertex for attenuation $$f_s(x^{(l)}, \omega_o^{(l)}, \omega^{(l)}) |\cos(\theta^{(l)})|, \forall 1 \leq l \leq k-1$$

(2) One channel per vertex for the material-light interaction tag (reflection, transmission, diffuse, glossy, specular)

(3) One channel per vertex for the roughness parameter of the BSDF (4) Three channels per path for radiance undivided by the sampling probability $$L_e(x^{(k)}, \omega_o^{(k)}) \Pi_{1 \leq l \leq k-1} f_s(x^{(l)}, \omega_o^{(l)}, \omega^{(l)}) |\cos(\theta^{(l)})|$$

(5) Three channels per path for the photon energy propagated through the path $$L_e(x^{(k)}, \omega_o^{(k)})$$

In addition to the path descriptor 211, a path sampling probability is collected from the path, and is directly supplied into the reconstruction network 220 rather than the path embedding network 212.

(6) One channel per path for the path sampling probability

The probability does not describe the geometric structure or radiometric properties of the path is greatly influenced by the underlying importance sampling method. Accordingly, the probability buffer 213 may hinder an optimization process between all samples of the path embedding network 212, so that a sampling probability buffer using the probability buffer 213 is directly inputted to the reconstruction network 220.

Figure 3:
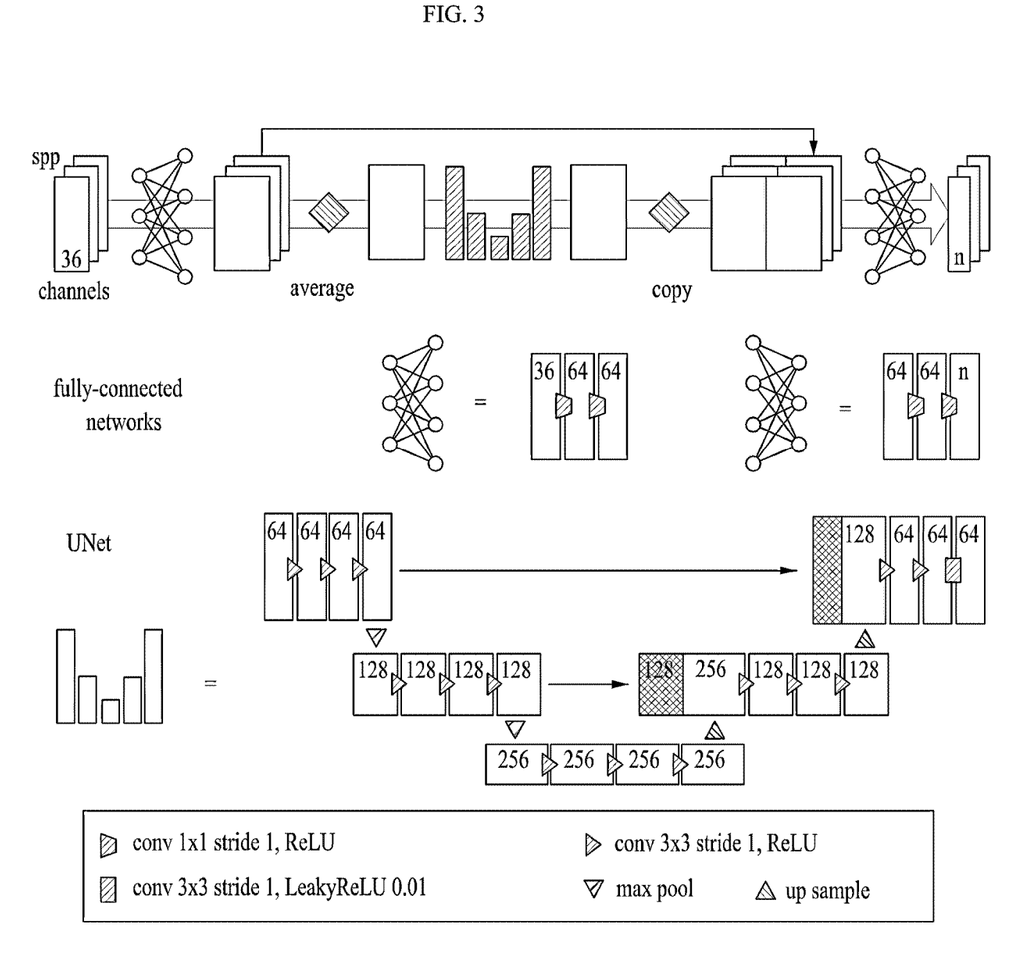
FIG. 3 illustrates architecture of a sample-based path embedding network in an embodiment of the present disclosure.

In the present disclosure, in order to construct the path embedding network 212, a sample-based a feature extractor block is adapted. Network complexity can be reduced by reducing the size of a middle feature map. The feature extractor block uses stacks of fully-connected layers and an UNet in order to embed path descriptor vectors by considering neighbor paths attributable to the convolution network. Architecture of the path embedding network 212 using the UNet is illustrated in FIG. 3.

The probability buffer 213, that is, the output of the path embedding network 212, flows in two branches simultaneously.

Figure 4:
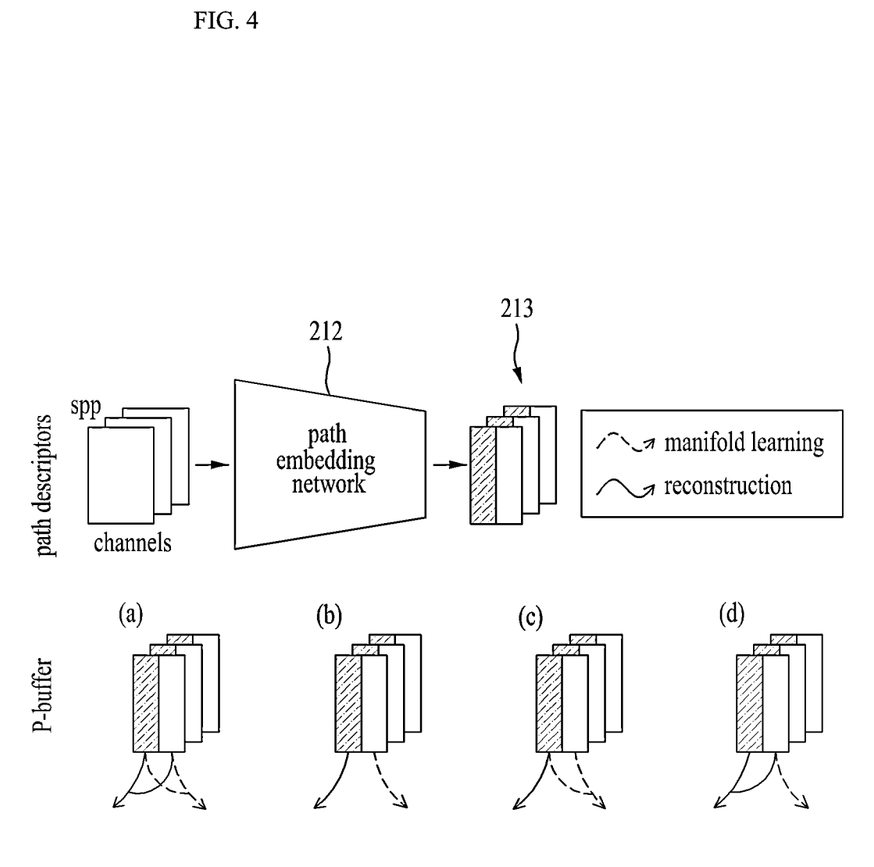
FIG. 4 illustrates an example of a probability buffer disentangling design between a manifold learning module and a reconstruction network in an embodiment of the present disclosure.

FIG. 4 illustrates an example of a disentangling design of the probability buffer 213 between the manifold learning module 210 and the reconstruction network 220. In the case of (a) of FIG. 4, the same embedding is provided to the manifold learning module 210 and the reconstruction network 220. In the case of (b) of FIG. 4, an output feature space may be explicitly disentangled in a channel way. Half of a channel is supplied to the reconstruction network 220, and the remaining channel may be used to calculate a manifold loss. In the case of (c) and (d) of FIG. 4, a partially shared feature space is provided to the manifold learning module 210 and the reconstruction network 220.

For example, in manifold learning according to the present disclosure, a structure (a) in which the same embedding is provided to the manifold learning module 210 and the reconstruction network 220 is used. In other words, a duplicate of the probability buffer 213 is used to evaluate a contrastive loss, and another duplicate is supplied to a given reconstruction network 220. A sample variance channel of the probability buffer 213 and a path probability buffer are added to another duplicate before the reconstruction network 220 is processed.

Manifold learning according to the present disclosure has an object of learning related embedding from the path descriptor 211.

A contrastive loss is widely used to solve the manifold learning problem, but one constraint is that an actually measured label that determines whether two data points are a positive or negative pair is necessary for the loss.

Accordingly, in the present disclosure, the contrastive approach is integrated with weakly-supervised learning. That is, similar labels for a path sampled in a pixel are generated by using reference radiances in the pixel. Thereafter, the distance between two path embeddings is modulated by measuring a distance L2 between the labels.

When considering a path descriptor pair {x, y} (wherein x, $y \in \mathbb{R}^{5k+1}$) and reference radiances {$I_x$, $I_y$} (wherein $I_x$, $I_y \in \mathbb{R}^3$), a path disentangling loss at the pixels where respective paths are sampled is the same as Equation 4.

$$\mathcal{L}_m = (\|\mathcal{F}(x) - \mathcal{F}(y)\|_2^2 - \|\tau(I_x) - \tau(I_y)\|_2^2)^2 \quad \text{[Equation 4]}$$

wherein F is the path embedding network 212 of the manifold learning module 210.

$$\tau(I) = \left(\frac{i}{1+i}\right)^\gamma$$

is a tone-mapping function. In this case, the tone-mapping is required to reduce color values and the scope of the probability buffer 213, and leads stable training.

Such a loss indicates the discrepancy between a path embedding space and a reference color space. Two paths similar in the reference color space attract each other in the path manifold, while repelling each other in the opposite case. Intuitively, two paths embedded as neighbor paths on the same manifold have a high correlation contributing to correlated pixels, that is, pixels of similar colors after being converged with high sample counts. Furthermore, strong correlation between the probability buffer 213, that is, the input of the model, and a reference image actually improves MC reconstruction according to recent discussions on ideal features for denoising.

The regression loss optimizes a difference between a model output and a target, whereas the path disentangling loss optimizes a difference between the output of Equation 4 and a target. Accordingly, in the regression loss, only pixels may be compared at the same location in the output and the target. However, the manifold learning framework according to the present disclosure can reduce the sparsity of path data because two given paths can be compared regardless of their proximity in the proposed contrastive loss.

In the manifold learning framework according to the present disclosure, the reconstruction network 220 is guided by two supervised signals called the regression learning and the manifold learning. The regression loss has an object of directly reducing an error between the output and a reference image, and the manifold loss makes an effort to produce features that are representative and different in the path space.

In Equation 4, a pair selection scheme for x and y is important to achieve robust and fast training. The network cannot learn meaningful weights if only easy pairs whose path disentangling error is relatively smaller than other pairs are selected. The present embodiment proposes non-local pair selection in order to alleviate the problem. Since training batches from high-resolution images are constructed, paths belonging to different patches are likely to have considerable distinctions in path manifold, just as their respective reference radiances. Accordingly, two paths from different patches, that is, a non-local pair, have a high chance to supply a hard case to a path disentangling loss, thus leading to robust contrastive training. In the present embodiment, a set of non-local pairs is constructed by randomly shuffling path descriptors within a batch and by comparing an original batch and a shuffled path descriptor 211. Furthermore, a set of local pairs is constructed to enforce the balance between similar and dissimilar cases. Samples are shuffled within patches, and the original and shuffled samples are compared.

Figure 5:
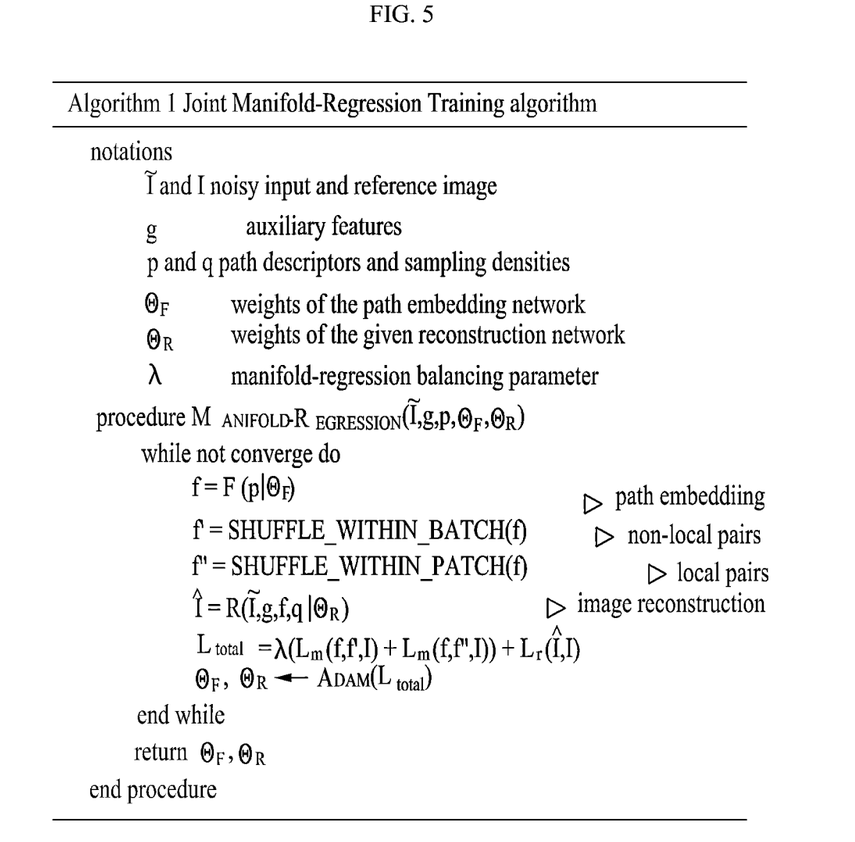
FIG. 5 illustrates an example of a manifold-regression learning algorithm in an embodiment of the present disclosure.

An overall training algorithm is summarized in a table of FIG. 5. λ=0.1 empirically produces good results. The path embedding network 212 generates embedding per sample. In contrast, the sample space probability buffer 213 may be converted into an image space through average counts along a sample count axis for the image space model.

The manifold learning method according to the present disclosure may be integrated with all image reconstruction techniques for removing noise of the ray tracing algorithm based on deep learning. In the rendering field, the manifold learning method is used to collect, store and use data for a light path. The present disclosure can decrease a feature value storage space or reduce the speed at which light path feature values are process by reducing the dimensions of light path feature value vectors.

Figure 6:
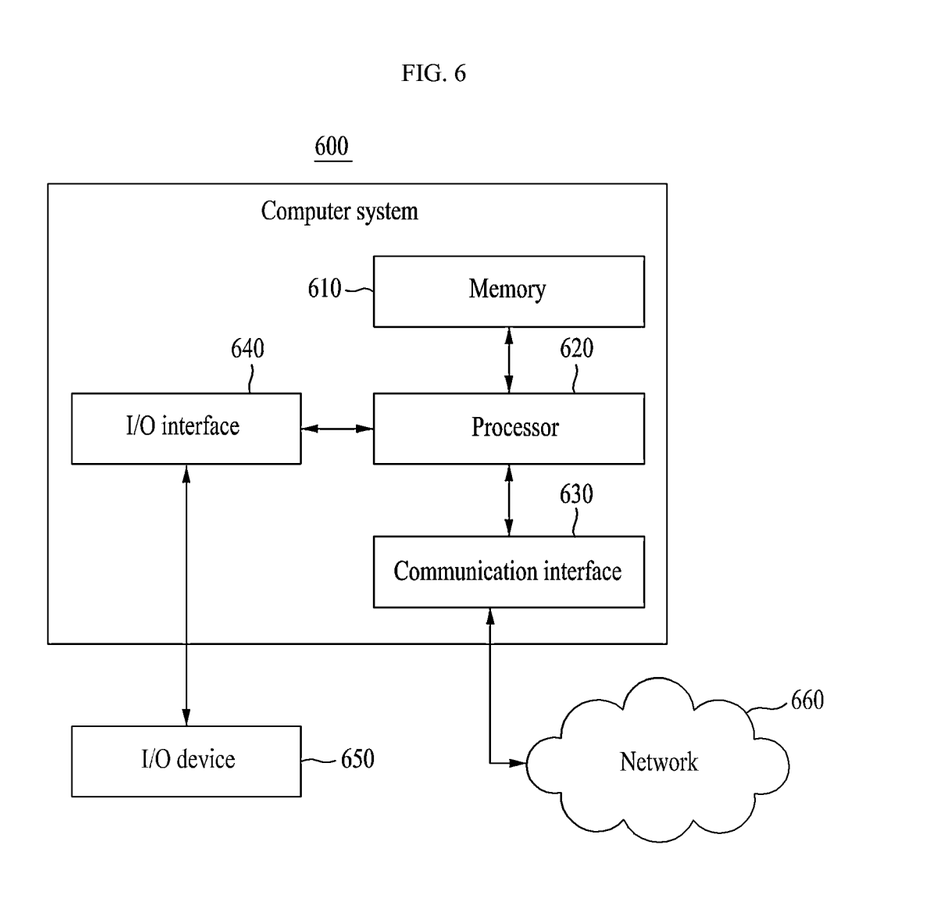
FIG. 6 is a block diagram illustrating an example of a computer system according to an embodiment of the present disclosure.

FIG. 6 is a block diagram illustrating an example of a computer system according to an embodiment of the present disclosure. The system for ray clustering learning may be implemented by a computer system 600 constructed as in FIG. 6.

As illustrated in FIG. 6, the computer system 600 may include a memory 610, a processor 620, a communication interface 630, and an input and output (I/O) interface 640 as components for executing the weakly-supervised learning-based ray clustering learning method according to embodiments of the present disclosure.

The memory 610 is a computer-readable medium, and may include permanent mass storage devices, such as a random access memory (RAM), a read only memory (ROM) and a disk drive. In this case, the permanent mass storage device, such as a ROM and a disk drive, may be included in the computer system 600 as a permanent storage device separated from the memory 610. Furthermore, an operating system and at least one program code may be stored in the memory 610. Such software components may be loaded from a computer-readable medium, separated from the memory 610, to the memory 610. Such a separate computer-readable medium may include computer-readable recording media, such as a floppy drive, a disk, a tape, a DVD/CD-ROM drive, and a memory card. In another embodiment, software components may be loaded onto the memory 610 through the communication interface 630 not a computer-readable medium. For example, the software components may be loaded onto the memory 610 of the computer system 600 based on a computer program installed by files received over a network 660.

The processor 620 may be configured to process instructions of a computer program by performing basic arithmetic, logic and input/output (I/O) operations. The instructions may be provided to the processor 620 by the memory 610 or the communication interface 630. For example, the processor 620 may be configured to execute received instructions based on a program code stored in a recording device, such as the memory 610.

The communication interface 630 may provide a function for enabling the computer system 600 to communicate with other devices over the network 660. For example, a request, a command, data or a file generated by the processor 620 of the computer system 600 based on a program code stored in a recording device, such as the memory 610, may be provided to other devices over the network 660 under the control of the communication interface 630. Inversely, a signal, a command, data or a file from another device may be received by the computer system 600 through the communication interface 630 of the computer system 600 over the network 660. A signal, a command or a file received through the communication interface 630 may be transmitted to the processor 620 or the memory 610. A file received through the communication interface 630 may be stored in a storage device (e.g., the aforementioned permanent storage device) which may be further included in the computer system 600.

The communication method is not limited, and may include short-distance wireless communication between devices in addition to communication methods using communication networks (e.g., a mobile communication network, wired Internet, wireless Internet, and a broadcasting network) which may be included in the network 660. For example, the network 660 may include one or more given networks of a personal area network (PAN), a local area network (LAN), a campus area network (CAN), a metropolitan area network (MAN), a wide area network (WAN), a broadband network (BBN), and the Internet. Furthermore, the network 660 may include one or more of network topologies, including a bus network, a star network, a ring network, a mesh network, a star-bus network, and a tree or hierarchical network, but is not limited thereto.

The I/O interface 640 may be means for an interface with an I/O device 650. For example, the input device may include a device, such as a microphone, a keyboard, or a mouse. The output device may include a device, such as a display or a speaker. For another example, the I/O interface 640 may be means for an interface with a device in which functions for input and output have been integrated into one, such as a touch screen. At least some of the I/O device 650, together with the computer system 600, may be configured as a single device.

Furthermore, in other embodiments, the computer system 600 may include components greater or smaller than the components of FIG. 6. However, it is not necessary to clearly illustrate most of conventional components. For example, the computer system 600 may be implemented to include at least some of the I/O device 650 or may further include other components, such as a transceiver and various databases.

As described above, according to embodiments of the present disclosure, noise can be removed from an image rendered by a ray tracing algorithm and the rendered image can be reconstructed as a clean image by a geometry and optical weakly-supervised learning clustering scheme that represents a light path by modifying the ray tracing algorithm.

The aforementioned apparatus or device may be implemented as a hardware component or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller.

Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to embodiments may be implemented in the form of a program instruction executable by various computer means and stored in a computer-readable medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or storage media managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A ray clustering learning method performed in a computer system,
wherein the ray clustering learning method is for learning a denoising model for removing noise from a rendered image through ray tracing, and comprises:
extracting, by at least one processor included in the computer system, a feature of a simulated ray through the ray tracing; and
clustering, by the at least one processor, the ray through contrastive learning for the feature,
wherein clustering the ray comprises:
mapping the feature to a low-dimensional space by using a deep neural network, and performing the contrastive learning as weakly-supervised learning by using reference pixel colors for a light path as a pseudo label; and
learning the denoising model by using low-dimensional embedding of the light path trained through the contrastive learning.

2. The ray clustering learning method of claim 1, wherein extracting the feature comprises generating a path descriptor representing radiometric properties of a light path.

3. The ray clustering learning method of claim 2 wherein the path descriptor comprises a channel representing a bidirectional scattering distribution function of a vertex of the light path and a channel representing a lighting condition of the light path.

4. The ray clustering learning method of claim 1, wherein performing the contrastive learning comprises constructing a set of non-local pairs as a pair for the contrastive learning.

5. The ray clustering learning method of claim 1, wherein:
the denoising model comprises a path embedding network which learns a path-space manifold and a regression-based reconstruction network which learns a correlation between pixels, and
learning the denoising model comprises jointly training the path embedding network and the reconstruction network with respect to a manifold loss and a regression loss.

6. The ray clustering learning method of claim 5, wherein the manifold loss is based on a contrastive loss and comprises a path disentangling loss for a learning of a path space.

7. The ray clustering learning method of claim 5, wherein training the path embedding network and the reconstruction network comprises providing, as identical embedding, a manifold learning module and the reconstruction network with a probability buffer which is an output of the path embedding network.

8. The ray clustering learning method of claim 5, wherein training the path embedding network and the reconstruction network comprises providing, as an input to the reconstruction network, a probability buffer which is an output of the path embedding network along with a geometry buffer.

9. The computer system of claim 1, wherein:
the denoising model comprises a path embedding network which learns a path-space manifold and a regression-based reconstruction network which learns a correlation between pixels, and
learning the denoising model comprises jointly training the path embedding network and the reconstruction network with respect to a manifold loss and a regression loss.

10. The computer system of claim 9, wherein the at least one processor is configured to provide, as identical embedding, a manifold learning module and the reconstruction network with a probability buffer which is an output of the path embedding network.

11. The computer system of claim 9, wherein the at least one processor is configured to provide, as an input to the reconstruction network, a probability buffer which is an output of the path embedding network along with a geometry buffer.

12. A non-transitory computer-readable recording medium storing instructions that. when executed by a processor, cause the processor to execute a ray clustering learning method in a computer system,
wherein the ray clustering learning method is for learning a denoising model for removing noise from a rendered image through ray tracing, and comprises:
extracting a feature of a simulated ray through the ray tracing; and
clustering the ray through contrastive learning for the feature, wherein clustering the ray comprises:
mapping the feature to a low-dimensional space by using a deep neural network, and performing the contrastive learning as weakly-supervised learning by using reference pixel colors for a light path as a pseudo label; and
learning the denoising model by using low-dimensional embedding of the light path trained through the contrastive learning.

13. A computer system comprising:
at least one processor configured to execute computer-readable instructions included in a memory,
wherein the at least one processor is for learning a denoising model for removing noise from a rendered image through ray tracing, and is configured to:
extract a feature of a simulated ray through the ray tracing, and
cluster the ray through contrastive learning for the feature,
wherein the at least one processor is configured to:
map the feature to a low-dimensional space by using a deep neural network, and perform the contrastive learning as weakly-supervised learning by using reference pixel colors for a light path as a pseudo label, and
learn the denoising model by using low-dimensional embedding of the light path trained through the contrastive learning.

* * * * *